US009253693B2

(12) United States Patent
Pang et al.

(10) Patent No.: US 9,253,693 B2
(45) Date of Patent: Feb. 2, 2016

(54) OPTIMIZING A NEIGHBOR LIST OF ACCESS POINTS

(71) Applicant: Cisco Technology, Inc., San Jose, CA (US)

(72) Inventors: Tak Ming Francis Pang, Fremont, CA (US); David S. Stephenson, San Jose, CA (US); Santosh Pandey, Santa Clara, CA (US); Vishal Satyendra Desai, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 13/772,896

(22) Filed: Feb. 21, 2013

(65) Prior Publication Data

US 2014/0171069 A1    Jun. 19, 2014

Related U.S. Application Data

(60) Provisional application No. 61/739,007, filed on Dec. 18, 2012.

(51) Int. Cl.
*H04W 36/00* (2009.01)

(52) U.S. Cl.
CPC ................... *H04W 36/0083* (2013.01)

(58) Field of Classification Search
CPC ....... H04W 8/02; H04W 48/00; H04W 48/02; H04W 48/04; H04W 48/10; H04W 40/16; H04W 48/17; H04W 48/18; H04W 48/20; H04W 88/00; H04W 88/10; H04W 36/00; H04W 36/0083; H04W 36/0088; H04W 52/34; H04W 52/343; H04W 40/34; H04W 40/36; H04W 36/0061; H04W 92/10; H04W 72/1242; H04W 88/08; H04W 8/08; H04W 8/16; H04W 48/06; H04M 15/8038; H04M 2215/34; H04M 2215/7442; H04M 2215/78
USPC ............ 455/41.2, 62, 67.11, 418–421, 422.1, 455/432.1–432.3, 433–434, 435.1–435.3, 455/436–451, 452.1–452.2, 453, 455/456.1–456.3, 500, 509, 512–515, 517, 455/522, 524–526, 550.1, 552.1, 560–561; 370/310, 328–329, 331, 338
See application file for complete search history.

(56) References Cited

U.S. PATENT DOCUMENTS

| | | | |
|---|---|---|---|
| 5,915,221 A * | 6/1999 | Sawyer | H04W 36/0083 455/437 |
| 6,295,450 B1 | 9/2001 | Lyer et al. | |
| 8,228,870 B1 * | 7/2012 | Sigg | H04W 48/18 370/331 |
| 8,934,369 B2 * | 1/2015 | Cao | H04W 36/0083 370/252 |
| 2003/0235164 A1 | 12/2003 | Rogers et al. | |
| 2004/0092259 A1 * | 5/2004 | Blanc et al. | 455/432.1 |
| 2004/0235478 A1 * | 11/2004 | Lindquist | H04W 36/0083 455/440 |
| 2005/0060319 A1 | 3/2005 | Douglas et al. | |
| 2006/0294246 A1 * | 12/2006 | Stieglitz et al. | 709/228 |

(Continued)

*Primary Examiner* — Meless Zewdu

(57) ABSTRACT

In an example embodiment, a neighbor radio/access point (AP) list is obtained. The neighbor AP list is optimized for a client that is associated with a current access point. The list may be optimized based on any one or combination of techniques, including but not limited to roaming patterns of previous clients that were associated with the current access point, radio frequency metrics, bandwidth requirements for the client, and/or any other suitable criteria. In particular embodiments, requests from the client to associate with an access point that is not on the optimized neighbor AP list may be denied.

18 Claims, 3 Drawing Sheets

(56) References Cited

U.S. PATENT DOCUMENTS

| | | | |
|---|---|---|---|
| 2007/0076671 A1* | 4/2007 | Winget et al. | 370/338 |
| 2007/0258393 A1* | 11/2007 | Cam-Winget | G01S 5/02 370/310 |
| 2008/0225797 A1* | 9/2008 | Kim | H04W 36/0083 370/331 |
| 2008/0227455 A1* | 9/2008 | Kim | 455/436 |
| 2008/0293400 A1* | 11/2008 | Okabe | H04W 24/02 455/423 |
| 2009/0061871 A1* | 3/2009 | Gross et al. | 455/436 |
| 2009/0088152 A1* | 4/2009 | Orlassino | H04W 48/08 455/432.1 |
| 2009/0252097 A1* | 10/2009 | Iyer et al. | 370/329 |
| 2009/0264118 A1* | 10/2009 | Robson | 455/423 |
| 2012/0155385 A1* | 6/2012 | Bencheikh | 370/328 |
| 2012/0225657 A1* | 9/2012 | Watanabe et al. | 455/436 |
| 2014/0098682 A1* | 4/2014 | Cao | H04W 36/0083 370/252 |

\* cited by examiner

OPTIMIZING A NEIGHBOR LIST OF ACCESS POINTS

CROSS REFERENCE TO RELATED APPLICATIONS

This application claims the benefit of U.S. Provisional Application No. 61/739,007 filed Dec. 18, 2012.

TECHNICAL FIELD

The present disclosure relates generally to optimizing a neighbor list to assist a roaming wireless device, such as an Institute of Electrical and Electronics Engineers ("IEEE") 802.11 neighbor list.

BACKGROUND

The 802.11 neighbor list element is intended to enable a wireless system to let a wireless station know about other access points (APs) in the neighborhood. When a wireless stations roams, the wireless station can make use of the list to optimize its operation and to select a new AP. For example the list can be employed to reduce active and inactive scanning and aid in picking the best AP in the list.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
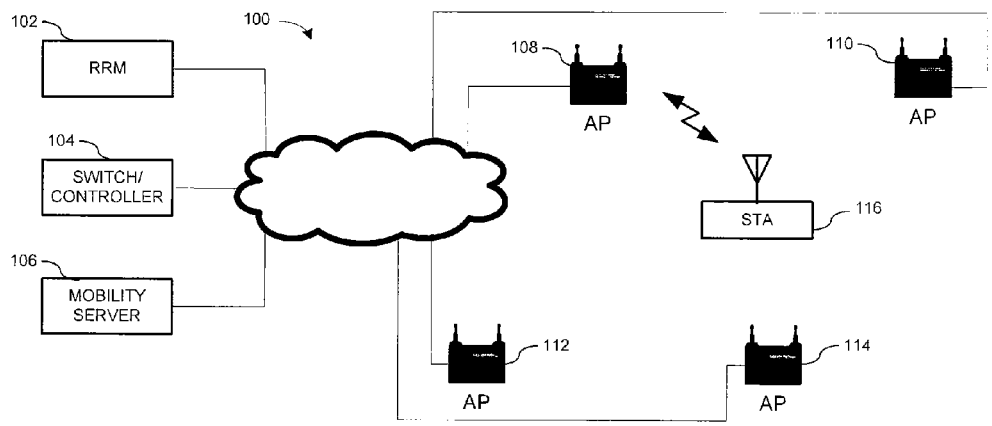
FIG. 1 is a functional block diagram illustrating an example of a network that implements an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described herein are various techniques for generating a neighbor AP list. The techniques described in the example embodiments herein may be employed individually or combined in any combination for generating a neighbor AP list for a client.

Described in an example embodiment herein is logic encoded in a non-transitory, tangible, computer readable medium for execution by a processor. When executed, the logic is operable to obtain a neighbor access point list and optimize the neighbor access point list for a client associated with a current access point. The logic is further operable to send the optimized neighbor access point list to the client, and control roaming of the client based on the optimized neighbor access point list. Roaming of the client is controlled by denying a request from the client to associate with an access point that is not on the optimized neighbor access point list.

Described in an example embodiment herein is an apparatus comprising an interface for sending and receiving data, and neighbor list logic coupled with the interface and operable to communicate via the interface. The neighbor list logic is operable to obtain a neighbor access point list. The neighbor list logic is operable to optimize the neighbor access point list for a client. The neighbor list logic is operable to send the optimized neighbor access list to the client via the interface, and the neighbor list logic is operable to control roaming of the client based on the optimized neighbor access list. Roaming of the client is controlled by denying a request from the client to associate with an access point that is not on the optimized neighbor access point list. Other embodiments are directed to methodologies performed by the aforementioned apparatus.

Described in an example embodiment herein is a method comprising obtaining a neighbor access point list, and optimizing the neighbor access point list for a client associated with a current access point. Optimizing the neighbor access point list comprises maintaining statistics for a current access point the client is currently associated, the statistics comprising previous access points previous clients have roamed from prior to associating with the current access point, and the next access points the previous clients associated. Neighboring access points are prioritized in the optimized neighbor access point list based on the next access points previous clients associated that also associated with the same previous access point as the client. Other embodiments may include an apparatus and/or a computer readable medium with instruction encoded thereon for implementing the aforementioned method.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a neighbor AP list for a client is based on the AP RRM (Radio Resource Management) neighbor table. The RRM collects RF metrics for a wireless system using any suitable method. The RRM table can include a list of known neighbor radios. The RRM records the RF and other non-RF metrics of these known neighbors in the RRM table. An algorithm employing any one or combination of techniques described herein may be employed for optimizing, or prioritizing the neighbor AP list for the client to direct the client to attempt to associate with preferred access points (and/or individual radios) first. As used herein, the neighbor AP list may include neighboring radios such as individual radios for access points having multiple radios. The list may be prioritized by individual radios.

In an example embodiment, RF metrics between the AP that the client is currently associated, and neighboring APs, may be employed for optimizing the neighbor list. For example, neighbors on certain channels can be preferred. For example, if the client's current channel or any specific channel is crowded, neighboring APs operating on other specific channels can be selected that reduce co-channel interference. In addition, neighbors with the best observed signal strength, e.g., Received Signal Strength Indication ("RSSI") can be selected.

In an example embodiment, the neighbor list can be prioritized according to band. For example, a "band-select" feature may be employed to suppress probe responses to the client in order to direct the client away from certain bands that the wireless system determines are undesirable for the client and/or for network performance. When a client does not receive a response for their probe request, the client could believe there is no AP available for association in the band and move to other bands. Thus, if a "band-select" feature is enabled, neighbors on a certain band (e.g., 5 GHz band) can be listed first on the neighbor list. This can help push a client to a preferred band (e.g., 5 GHz) for better performance. If the "band-select" is not enabled, the default is to first include neighbor radios in the same band that the client is currently using. This can help a single band client find the appropriate neighbors. In particular embodiments, a probe database and the association history of the client can be employed to determine whether a client is a single, or multi-band client. For single band clients, the neighbor list can be limited to neighboring APs that are on the same band of the client.

In an example embodiment, the direction that a client is traveling can be employed to optimize the neighbor list. In particular embodiments, roaming statistics of clients can be indexed in the form of the previous AP a client was associated with, current AP the client is associated with, and next AP that a client associates. For example, for clients arriving from a first AP at a second AP, the roaming statistics can be employed to determine how many clients that roamed from the first AP to the second AP subsequently roamed to a third AP or to a fourth AP when roaming from the second AP. Thus, the neighbor list can be optimized to select APs or radio neighbors where the most historic roams from the second AP occurred when a client roams to the second AP from the first AP. Thus, by tracking previous AP, current AP, and subsequent AP, the neighbor list may be different if a client roams to the second AP than from a first AP, than when a client roams to the second AP from another AP (e.g., an AP other than the first AP). In another example embodiment, a less sophisticated algorithm can be employed which collects roaming statistics from a current AP to a subsequent AP.

By tracking the previous and current APs for a client, and their respective locations, a rough direction of travel for the client can be determined. Additional weighting can be given to neighboring APs in the same direction of travel with respect to the current AP. Thus, neighboring APs closer to the previous AP can be de-prioritized in the selection of neighboring APs for the optimized list since they are opposite the direction that the client is traveling. In other embodiments, location and direction of travel may be obtained from a location server disposed on the network.

In an example embodiment, an "assisted roaming" feature can be employed to deny a client association with a neighbor AP that is not included in the neighbor AP list for the client. In particular embodiments, a client may be allowed to roam to an AP not in the neighbor list after a predefined criteria is met, such as after a number of attempts at associating with the neighboring AP or after a predetermined time period.

In an example embodiment, load balancing may be employed for optimizing the neighboring AP list. When load balancing is enabled, radios or APs with heavier loads can be de-prioritized from the list and APs and radios with lower loads can be prioritized. If load balancing is not enabled and a neighbor is not overloaded, it is also possible to select neighbors with the most recent roams from the current APs.

In an example embodiment, the floor location of an AP can be employed for optimizing a neighbor list. For example, neighbors on the same floor as the current AP and/or the previous AP of the client will be given extra weighting over neighboring APs on different floors. In an example embodiment, this can be implemented by adding favorable RF metrics (e.g., temporarily giving extra weighting to neighbors on the same floor when optimizing the neighbor list) to the APs on the same floor.

In an example embodiment, the location of the requesting client can be employed to optimize a neighbor list. For example, broadcast probes from the client received on both 2.4 and 5 GHz bands are used to form a location estimation of the client. Adjustment can be applied to the signals to compensate for the band differences and to derive the location of the client from one band to another. For example, if 2.4 and 5 GHz RSSIs are pooled together (with a −7 dB adjustment going from 2.4 to 5.5 GHz and/or +7 dB going from 5.5 to 2.4 GHz), the closest APs from the client can be determined. This can aid in determining the location of a client when no active probes are received in a Dynamic Frequency Selection ("DFS") band, provided that the client does scan other bands.

In an example embodiment, the current traffic of the client is considered in optimizing the neighbor AP list. For example, by tracking the important and high bandwidth current traffic of the client, APs can be eliminated from the neighbor AP list that cannot meet the current traffic demands of the client. Also, for example, the network based application recognition ("NBAR") context of the client can reveal certain traffic requirements of the client. For example, if only 802.11n APs can support video, and a client is receiving a video stream, non-802.11n APs can be removed from the neighbor AP list.

In an example embodiment, roam counts between the AP's neighbors can be tracked. A roam count is incremented for each successful association after roaming. When the total roams from an AP reaches a predefined threshold, the total and individual roam counts are reduced for all neighbors on the list (e.g., divided in half). This prevents counter wrapping around while preserving the relative proportion of roam counts between the neighbors.

FIG. 1 is a functional block diagram illustrating an example of a network 100 that implements an example embodiment described herein. In the illustrated example, the network 100 comprises a radio resource management (RRM) 102, a switch/controller 104 coupled with access points (APs) 108, 110, 112, and 114, and a mobility server 106. The links coupling switch/controller 104 with APs 108, 110, 112, and 114 may suitably comprise wired, wireless, or a combination of wireless and wireless links. A wireless client, or station ("STA") 116 is in wireless communication with at least one of APs 108, 110, 112, and 114. Although the illustrated example has four APs 108, 110, 112, and 114, those skilled in the art should readily appreciate that the number of APs, and the arrangement of APs, in this example were selected for ease of illustration and that a network implementing the example embodiments described herein may have any physically realizable number of APs, switch/controllers, and clients, and have any suitable physical arrangement. Optionally, a mobility server 106 may be employed to track the geographical location of the wireless client 116.

The RRM 102 generates a neighbor AP list for AP 108, AP 110, AP 112, and AP 114. The neighbor AP list provided to the wireless client 116 by the AP associated with the wireless client 116 is optimized for the wireless client 116. As those skilled in the art can readily appreciate, any suitable device disposed on network 100 may optimize the neighbor AP list for wireless client 116. For example, the AP associated with the wireless client 116 (in this example AP 108) may optimize the neighbor AP list, the switch/controller 104, or a dedicated device (not shown) may be employed to optimize the neighbor AP list provided to the wireless client 116.

In an example embodiment, the neighbor list employs Radio Frequency ("RF") metrics between the currently associated AP for the wireless client 116 (e.g., AP 108 in the illustrated example) and neighboring APs (e.g., APs 110, 112, 114 in the illustrated example. For example, neighboring APs on certain channels can be preferred. If the current channel or any specific channel is crowded, an AP can be selected for the optimized neighbor AP list to reduce co-channel interference. In particular embodiments, neighboring APs with the best observed signal strength (e.g., Received Signal Strength Indication "RSSI") are included on the optimized neighbor AP list. This can enable the client to associate with the closest neighbor in terms of RF distances.

In an example embodiment, APs are prioritized in the optimized neighbor AP list according to band. For example, if a "band-select" feature is enabled, and the preference is to have the client employ a first band (e.g., the 5 GHz band), APs with radios in the selected band appear in the optimized neighbor AP list first. This will facilitate directing the wireless client 116 to a preferred band (such as the 5 GHz band) for better performance. If the "band-select" feature is not enabled, a default can be to first include APs with the neighbor radios on the same band the wireless client 116 is employing for association. Thus, a single band client will get the appropriate neighbor AP information. In particular embodiments, probe history and association history of the client can be employed to determine whether the wireless client 116 is single band client. If wireless client 116 is determined to be single band clients, the optimized neighbor AP list can be limited to APs on the same band as the wireless client 116.

In an example embodiment, the direction of motion of the wireless client 116 is employed as an input to optimize the neighbor list. For example, using statistics of clients on a controller, data may be indexed such as first AP the client associated with, the second AP a client associated with, a third AP the client associated with, etc. For example, for clients roaming from AP 108 to AP 110, statistics can be gathered about how many clients roam from AP 110 to AP 112, AP 114, or any other AP. Thus, the neighbor list may be optimized to prioritize by APs or radio neighbors with most historic roams from AP 110 when a client is from AP 108 to AP 110. For example, the set of neighbors in the list can be different if a client roamed to AP 110 from an AP other than AP 108 (for example if the client roamed from AP 112 to AP 108). In particular embodiments, statistics may track roams by the current AP (e.g., where did the most clients roam to from AP 110 without regard where the client was before associating with AP 110).

By tracking previous and current AP associations, and their respective locations, the optimized neighbor AP list can be prioritized by neighbors that appear to be in the same direction of motion of the client. Neighboring APs close to a previous AP can be de-prioritized since they are in the opposition direction that the client is moving.

In an example embodiment, an "assisted roaming" feature can be employed to prevent wireless client 116 from associating with an AP that is not included in the neighbor AP list. In particular embodiments, a threshold may be employed to allow the wireless client 116 to associate with an AP not on the neighbor AP list after the client attempts to associate with an AP (or multiple APs) that are not on the list after a predetermined number of denials, or if the AP does not associate with an AP on the neighbor list within a predetermined time period. For example, if AP 110 is not the neighbor AP list for the wireless client 116, AP 110 will deny association with the wireless client 116. However, in particular embodiments, AP 110 may allow the wireless client 116 to associate after a predefined number of denials (for example, after five denials) or after a predetermined time period.

In an example embodiment, load balancing may be employed for optimizing the neighbor AP list provided to the wireless client 116. For example, when load balancing is enabled, radios or APs with heavier loads will be de-prioritized from the list and APs and radios with lower loads will be prioritized. If load balancing is not enabled and a neighbor AP or radio is not over a predefined load limit, neighboring APs or radios can be prioritized based on where the most number of recent roam from the current AP occurred. Thus, the most recent roaming pattern can be employed to direct clients for a certain live event at a location (for example in a building) to the most popular AP that is not overloaded.

In an example embodiment, a floor location of an AP can be employed for generating a neighbor list. For example, neighboring APs that are on the same floor as the AP that wireless client is currently associated (e.g., AP 108 in the illustrated example), and the previous AP that the client was associated can be prioritized over APs on a different floor. In particular embodiments, this can be implemented by adding favorable RF metrics to APs on the same floor (e.g., by temporarily giving extra weighting to neighbors on the same floor when optimizing the neighbor list).

In an example embodiment, the location of the wireless client 116 is employed for selecting neighboring APs for the neighbor list. Any suitable technique may be employed for ascertaining the location of wireless client 116, including, but not limited to, signal strength measurements (such as Received Signal Strength Indications "RSSIs"), Angle of Arrival ("AOA"), and/or Time Difference of Arrival ("TDOA").

In an example embodiment, broadcast probes of a client received in both 2.4 and 5 GHz bands can be used to form a location estimate of the wireless client 116 by mobility server 106. In particular embodiments, an adjustment is applied to a signal received in one of the bands (e.g., the 2.4 GHz band or the 5 GHz band) to compensate for differences in the bands to derive the location of the client.

For example, if the measured RSSIs from the 2.4 and 5 GHz are pooled together (with a −7 dB adjustment (or any adjustment which may be estimated or empirically observed) going from 2.4 to 5.5 GHz (or vice versa +7 dB when going from 5.5 to 2.4 GHz), the location of the client can be estimated to determine where the closest APs are to wireless client 116. This can be useful when wireless client 116 cannot send probes on a certain band or channel because of Dynamic Frequency Selection ("DFS") restrictions (e.g., a DFS channel or any channel where a client is supposed to scan the channel for a predetermined time period, such as 30 seconds, before sending a probe—the wireless client 116 may not be able to leave its current channel for the predetermined time period and thus will not send probes on a restricted (e.g., DFS) channel).

In an example embodiment, the current traffic or applications employed by the wireless client 116 can be used as a criteria for selecting APs for the optimized neighbor AP list. For example, if video is only supported by certain APs (for example IEEE 802.11n compatible APs), the optimized neighbor AP list can be limited to APs that support video. Thus by tracking the important and/or high bandwidth traffic of wireless client 116, neighboring APs that cannot meet the current traffic demand of the client can be eliminated from the optimized neighbor AP list. In particular embodiments, the Network Based Application Recognition ("NBAR") context of the wireless client 116 can be employed to determine traffic requirements of a client, and to optimize the neighbor AP list accordingly.

In an example embodiment, roam counts between neighbor APs can be employed for optimizing the neighboring AP list. For example, the number of times clients are observed roaming from a first AP (e.g., AP 108) to a second AP (e.g., AP 110), a third AP (e.g., AP 112), or a fourth AP (e.g., AP 114) can be tracked. If clients roam from the first AP to the second AP five times, from the first AP to the third AP ten times, and from the first AP to the third AP fifteen times, the third AP can be prioritized. In particular embodiments, total and individual roam counts can be reduced by a specified amount whenever a predefined threshold is exceeded (for example, divided in half). For example, using the previous example, when the total roam count exceeds 29, the counts may be divided in half (e.g., the number of roams from the first AP to second AP is reduced to two or three depending on rounding, the number of roams from the first AP to third AP is reduced to five, and the number of roams from the first AP to the third AP is reduced to seven or eight depending on rounding. This can prevent a counter from wrapping around while preserving the relative proportion of roams between neighbor APs.

Figure 2:
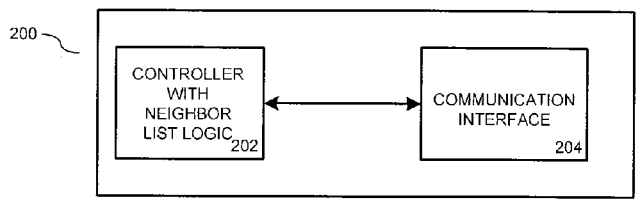
FIG. 2 is a block diagram illustrating an example of an apparatus that can generate a neighbor AP list in accordance with an example embodiment.

FIG. 2 is a block diagram illustrating an example of an apparatus 200 that can generate an optimized neighbor AP list in accordance with an example embodiment described herein. Apparatus 200 can be a standalone device or can be implemented as part of switch/controller 104 (FIG. 1), and/or APs 108, 110, 112, and 114 (FIG. 1). Apparatus 200 comprises a controller with neighbor list logic 202 and a communication interface 204.

Neighbor list logic 202 generates an optimized neighbor AP list for a client (such as wireless client 116 in FIG. 1) in accordance with an example embodiment. Neighbor list logic 202 may employ any one or combination of techniques described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Neighbor list logic 202 can obtain data for generating the neighbor list via communication interface 204. Neighbor list logic 202 may provide the neighbor list to the client via communication interface 204.

Figure 3:
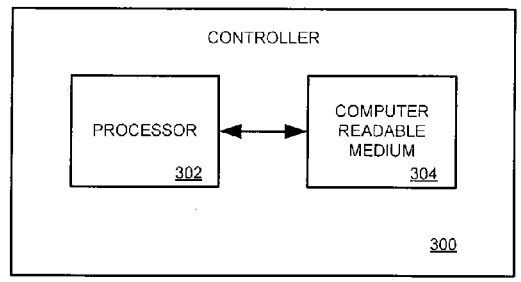
FIG. 3 is a block diagram illustrating an example of a controller that can be employed implementing an example embodiment.

FIG. 3 is a block diagram illustrating an example of a controller 300 that can be employed for implementing an example embodiment. The controller 300 may be implemented as part of apparatus 200 (FIG. 2). Controller 300 comprises a processor 302 coupled with a computer readable medium 304.

An aspect of the example embodiment is related to the use of controller 300 for providing an optimized neighbor list. According to an example embodiment, providing an optimized neighbor list is implemented by controller 300 in response to processor 302 executing one or more sequences of one or more instructions contained in the computer readable medium 304. Execution of the instructions contained in the computer readable medium 304 causes processor 302 to perform the functionality described herein. One or more processors in a multi-processing arrangement may also be employed to execute the instructions contained in computer readable medium 304. In alternative embodiments, hard-wired circuitry may be used in place of or in combination with software instructions to implement an example embodiment. Thus, the example embodiments described herein are not limited to any specific combination of hardware circuitry and software.

The term "computer-readable medium" as used herein refers to any medium that participates in providing instructions to processor 302 for execution. Such a medium may take many forms, including but not limited to non-volatile media, and volatile media. Non-volatile media include, for example, optical or magnetic disks. Volatile media include dynamic memory, such as a Read Only Memory (ROM) and/or a Random Access Memory ("RAM") which in particular embodiments can be a read/write memory. As used herein, tangible media may include any non-transitory media, such as a volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Figure 4:
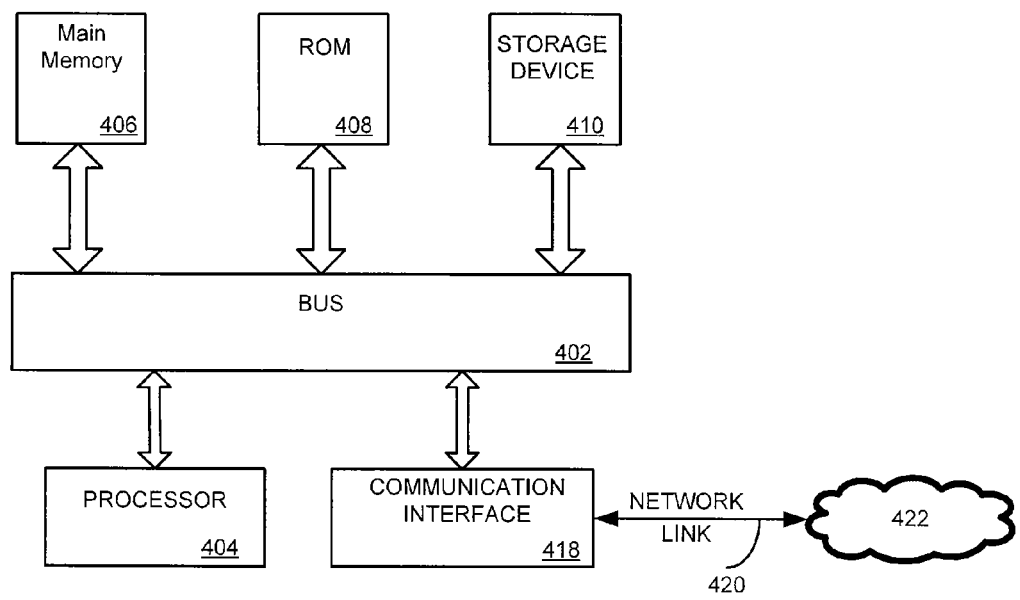
FIG. 4 is a block diagram illustrating an example of a computer system upon which an example embodiment is implemented.

FIG. 4 is a block diagram illustrating an example of a computer system 400 upon which an example embodiment is implemented. Computer system 400 can be employed for implementing the functionality of switch/controller 104 (FIG. 1), APs 108, 110 (FIG. 1), apparatus 200 (FIG. 2) and/or controller 300 (FIG. 3).

Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, and/or flash storage, is provided and coupled to bus 402 for storing information and instructions.

An aspect of the example embodiment is related to the use of computer system 400 for providing an optimized neighbor list. According to an example embodiment, providing an optimized neighbor list is implemented by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement an example embodiment. Thus, embodiments described herein are not limited to any specific combination of hardware circuitry and software.

Computer system 400 also includes a communication interface 418 coupled to bus 402. Communication interface 418 provides a two-way data communication coupling computer system 400 to a network link 420 that is connected to a local network 422. For example, communication interface 418 may be a local area network (LAN) card to provide a data communication connection to a compatible LAN. As another example, communication interface 418 may be an integrated services digital network (ISDN) card or a modem to provide a data communication connection to a corresponding type of telephone line. Wireless links may also be implemented. In any such implementation, communication interface 418 sends and receives electrical, electromagnetic, or optical signals that carry digital data streams representing various types of information.

Figure 5:
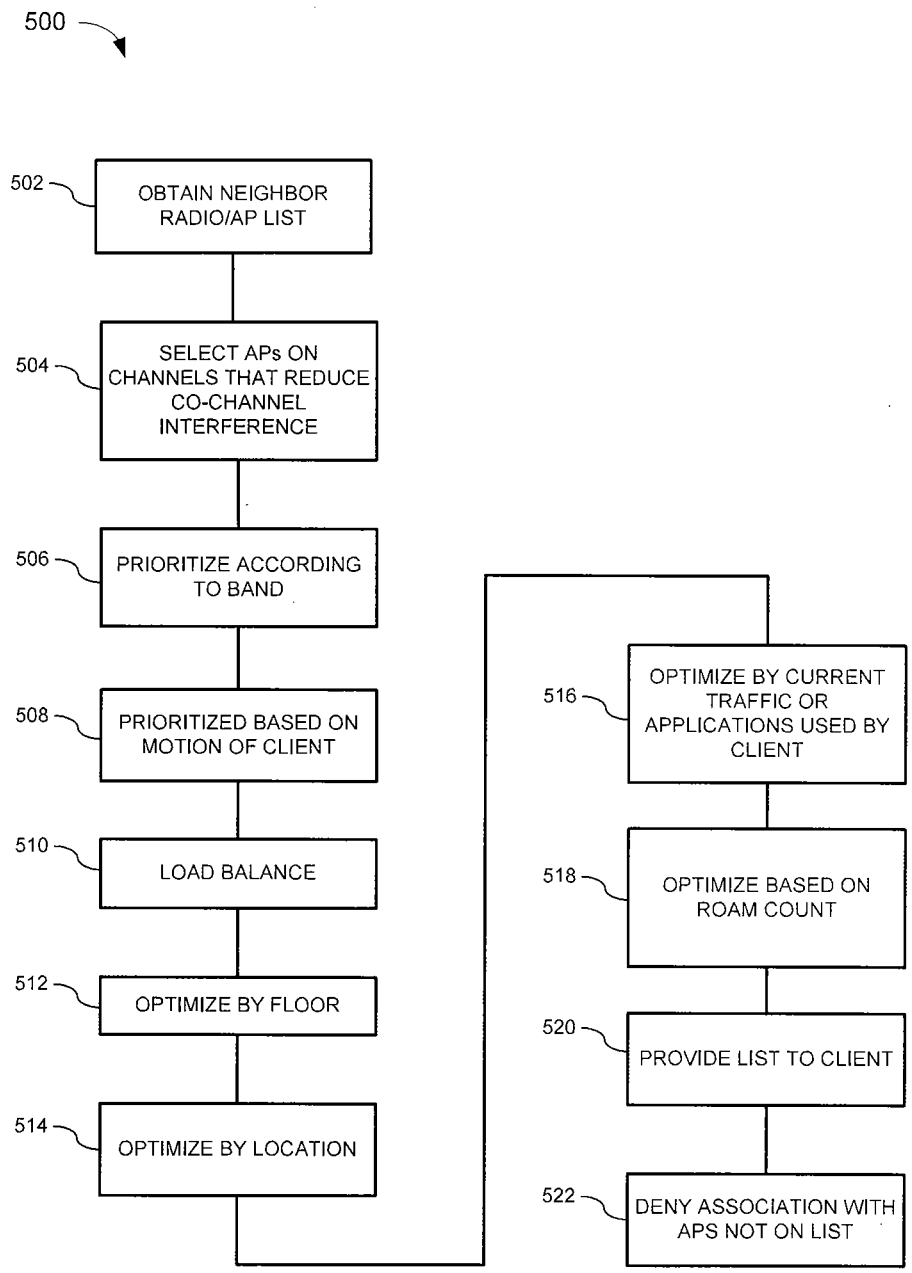
FIG. 5 is a block diagram illustrating an example of a methodology in accordance with an example embodiment.

In view of the foregoing structural and functional features described above, a methodology 500 in accordance with an example embodiment will be better appreciated with reference to FIG. 5. While, for purposes of simplicity of explanation, the methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. The methodology described herein is suitably adapted to be implemented in hardware, software that when executed by a processor performs the described functionality, or a combination thereof. The methodology 500 can be implemented by switch/controller 104 (FIG. 1), APs 108, 110 (FIG. 1), apparatus 200 (FIG. 2), controller 300 (FIG. 3), and/or computer system 400 (FIG. 4).

At 502, a neighbor radio/AP list (referred to hereinafter as a neighbor AP list) is obtained. Any suitable technique may be employed for generating the neighbor AP list. For example, the neighbor AP list may be comprised of AP's in a predetermined area. As another example, the neighbor AP list may be comprised of APs associated with a network segment and/or switch/controller. For APs that have multiple radios, the list may suitably comprise individual radios for the APs.

At 504, Radio Frequency ("RF") metrics between the AP that the client currently is associated and neighboring APs is obtained. In an example embodiment, neighbors on certain channels can be preferred. If the current channel or any specific channel is crowded, an AP can be selected from the neighbor AP list to reduce co-channel interference. In particular embodiments, neighbors with the best observed signal strength (e.g., Received Signal Strength Indication "RSSI"). This can enable the client to associate with the closest neighbor in terms of RF distances.

At 506, APs are prioritized according to band. For example, if a "band-select" feature is enabled, and the preference is to have the client employ a first band (e.g., the 5 GHz band), APs with radios in the selected band appear in the neighbor AP list first. This will facilitate directing the client to the preferred band (such as the 5 GHz band) for better performance. If the "band-select" feature is not enabled, a default can be to first include APs with the neighbor radios on the same band the client is employing for association. Thus, a single band client will get the appropriate neighbor AP information. In particular embodiments, probe history and association history of the client can be employed to determine whether the client is single band or multi-band client. For clients that are determined to be single band clients, the neighbor AP list can be optimized for the same band of the client.

At 508, the direction of motion of the client is employed to optimize the neighbor AP list. For example, using statistics of clients on a controller, data may be indexed such as first AP the client associated with, the second AP a client associated with, a third AP the client associated with, etc. For example, for clients roaming from AP 108 (FIG. 1) to AP 110 (FIG. 1), statistics can be gathered about how many of those clients roam from AP 110 (FIG. 1) to a third AP (e.g., AP 112 in FIG. 1), or a fourth AP (e.g., AP 114 in FIG. 1). Thus, the neighbor list may be optimized to prioritize by APs or radio neighbors with most historic roams from the current AP the client is associated based on the previous AP the client was associated. For example, the set of neighbor in the list can be different if a client roamed to AP 110 (FIG. 1) from an AP (e.g., AP 112 or AP 114 in FIG. 1) other than AP 108 (FIG. 1). In particular embodiments, statistics may employ roams just by the current AP (e.g., where did the most clients roam to after associating with AP 110 (FIG. 1) without regard where the client was before associating with AP 110).

By tracking previous and current AP associations, and their respective locations, the neighboring AP list can be prioritized by neighbors that appear to be in the same direction of motion of the client. Neighboring APs that are close to a previous AP can be de-prioritized since they are in the opposite direction that the client is moving.

At 510, load balancing is employed for optimizing the neighbor AP list. For example, when load balancing is enabled, radios or APs with heavier loads will be de-prioritized from the list and APs and radios with lower loads will be prioritized. If load balancing is not enabled and a neighbor AP or radio is not over a predefined load limit, neighboring APs or radios can be prioritized based on where the most number of recent roams from the current AP occurred. Thus, the most recent roaming pattern can be employed to direct clients for a certain live event at a location (for example in a building) to the most popular AP that is not overloaded.

At 512, the neighbor list can be optimized to prioritize neighboring APs based on the floor of the current AP the client is associated. For example, neighboring APs that are on the same floor as the current AP a client is associated with, and the previous AP the client was associated with, can be prioritized over neighbors on a different floor. In particular embodiments, this is implemented by adding favorable RF metrics to APs on the same floor (e.g., temporarily giving extra weighting to neighbors on the same floor when optimizing the neighbor list).

At 514, the location of the client is employed for selecting neighboring APs for the neighbor list. For example, broadcast probes of a client received in both 2.4 and 5 GHz bands can be used to form a location estimate of the client. In particular embodiments, an adjustment is applied to a signal received in one of the bands (e.g., the 2.4 GHz band or the 5 GHz band) to compensate for differences in the bands to derive the location of the client.

For example, if the measured RSSIs from the 2.4 and 5 GHz are pooled together (with a −7 dB adjustment (or any adjustment which may be estimated or empirically observed) going from 2.4 to 5.5 GHz (or vice versa +7 dB when going from 5.5 to 2.4 GHz), the location of the client can be estimated to determine where the closest APs are. This can be useful where a client cannot send probes in a certain band or channel because of Dynamic Frequency Selection ("DFS") restrictions (e.g., a DFS channel or any channel where a client is supposed to scan the channel for a predetermined time period, such as 30 seconds, before sending a probe—a client may not be able to leave its current channel for the predetermined time period and thus will not send probes on a restricted channel).

At 516, the current traffic or applications employed by a client can be employed for selecting APs for the neighbor list. For example, if video is only supported by certain APs (for example IEEE 802.11n compatible APs), the neighbor list can be optimized to be limited to APs that support video. Thus by tracking the important and high bandwidth current traffic of a client, neighboring APs that cannot meet the current traffic demand of the client can be eliminated or de-prioritized from the neighbor AP list. In an example embodiment, the Network Based Application Recognition ("NBAR") context of the client can be employed to determine traffic requirements of a client.

At 518, roam counts between neighbors are employed for prioritizing the neighboring AP list. For example, the number of times clients roam from a first AP to a second AP, a third AP, or a fourth AP can be tracked. If clients roam from the first AP to the second AP five times, from the first AP to the third AP ten times, and from the first AP to the third AP fifteen times, the third AP can be prioritized. In particular total and individual roam counts can be reduced by a specified amount whenever a predefined threshold is exceeded. For example, using the previous example, when the total roam count exceeds 29, the counts may be divided in half (e.g., the number of roams from the first AP to second AP is reduced to two or three depending on rounding, the number of roams from the first AP to third AP is reduced to five, and the number of roams from the first AP to the third AP is reduced to seven or eight depending on rounding. This can prevent a counter from wrapping around while preserving the relative proportion of roams between neighbors.

At 520, the optimized neighbor AP list is provided to the client. The optimized neighbor AP list may be optimized based on any one, or combination of techniques described in 504-518 herein supra.

At 522, an "assisted roaming" feature can be employed to deny a client association with a neighbor that is not included in the neighbor list for the client. In particular embodiments, a threshold may be employed to allow a client to associate with an AP not on the list after the client attempts to associate with an AP (or multiple APs) after a predetermined number of denials, or if the client does not associate with an AP on the neighbor list after a predetermined time period. Thus, if for some reason the client is unable to use the optimized AP list, for example the list is corrupted, the client does not lose connectivity with the network.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. Logic encoded in a non-transitory, tangible, computer readable medium for execution by a processor, and when executed, configured to:
   obtain a neighbor access point list;
   maintain statistics for a current access point a client is currently associated with, the statistics comprising previous access points previous clients have roamed from prior to associating with the current access point, and next access points the previous clients associated with;
   optimize the neighbor access point list for the client, comprising:
      determining one or more previous clients that associated with a same previous access point as the client; and
      prioritizing access points in the optimized neighbor access point list, based on the next access points the one or more previous clients associated with;
   send the optimized neighbor access point list to the client; and
   control roaming of the client based on the optimized neighbor access point list by denying a request from the client to associate with an access point that is not on the optimized neighbor access point list during a first period of time, wherein the client is allowed to associate with the access point that is not on the optimized neighbor access point list during a second period of time responsive to at least one of (i) a predetermined number of denials to associate with the access point not on the optimized neighbor access point list and (ii) a predetermined time period having elapsed during which the client does not associate with the access point that is on the optimized neighbor access point list.

2. The logic set forth in claim 1, wherein load balancing is a criteria employed to optimize the neighbor access point list.

3. The logic set forth in claim 1, wherein radio frequency metrics of neighboring access points are obtained; and
   wherein the radio frequency metrics are employed to optimize the neighbor access point list.

4. The logic set forth in claim 1, wherein the neighboring access point list is optimized by prioritizing neighboring access points that are on the same band that the client is currently using for communications.

5. The logic set forth in claim 1, further configured to:
   upon determining that the client is a multi-band client, prioritizing neighbor access points in a predetermined, preferred band in the optimized neighbor access point list.

6. The logic set forth in claim 5, wherein determining that the client is the multi-band client further comprises reviewing probe requests and association history for the client.

7. The logic set forth in claim 1, wherein optimizing the neighbor access point list is further based on locations where previous clients of the current access point roamed.

8. The logic set forth in claim 1, wherein access points on a same floor as the current access point associated with the client are prioritized in the optimized neighbor access point list.

9. The logic set forth in claim 1, further configured to maintain a traffic history for the client to determine a traffic requirement for the client; and
   wherein access points capable of handling the traffic requirement for the client are prioritized in the optimized neighbor access point list.

10. The logic set forth in claim 1, further configured to determine a bandwidth requirement for an application the client is executing; and wherein access points capable of meeting the bandwidth requirement for the application the client is executing are prioritized in the optimized neighbor access point list.

11. An apparatus, comprising:

an interface for sending and receiving data;

neighbor list logic coupled with the interface and configured to communicate via the interface by performing an operation, comprising;

obtaining a neighbor access point list;

maintaining statistics for a current access point a client is currently associated with, the statistics comprising previous access points previous clients have roamed from prior to associating with the current access point, and next access points the previous clients associated with;

optimizing the neighbor access point list for the client, comprising:

determining one or more previous clients that associated with a same previous access point as the client; and prioritizing access points in the optimized neighbor access point list, based on the next access points the one or more previous clients associated with;

sending the optimized neighbor access point list to the client via the interface; and controlling roaming of the client based on the optimized neighbor access point list by denying a request from the client to associate with an access point that is not on the optimized neighbor access point list during a first period of time, wherein the client is allowed to associate with the access point that is not on the optimized neighbor access point list during a second period of time responsive to at least one of (i) a predetermined number of denials to associate with the access point not on the optimized neighbor access point list and (ii) a predetermined time period having elapsed during which the client does not associate with the access point that is not on the optimized neighbor access point list.

12. The apparatus set forth in claim 11, wherein load balancing is a criteria employed to optimize the neighbor access point list.

13. The apparatus set forth in claim 11, wherein radio frequency metrics of neighboring access points are obtained; and wherein the radio frequency metrics are employed to optimize the neighbor access point list.

14. A method, comprising:

obtaining a neighbor access point list; and optimizing the neighbor access point list for a client associated with a current access point, comprising:

maintaining statistics for a current access point the client is currently associated with, the statistics comprising previous access points previous clients have roamed from prior to associating with the current access point, and next access points the previous clients associated with;

maintaining counters associated with access points where previous clients that associated with the current access point associated with the client have roamed;

reducing the counters in a manner that preserves the proportion of the counters when a predefined threshold is exceeded; and upon determining a direction of travel of the client based on the maintained counters and statistics, prioritizing neighboring access points within the neighbor access point list based on the determined direction of travel;

wherein neighboring access points are prioritized in the optimized neighbor access point list based on the next access points previous clients associated with that also associated with the same previous access point as the client.

15. The method according to claim 14, wherein optimizing the neighbor access point list further comprises:

upon determining that the client is a multi-band client, prioritizing neighbor access points in a predetermined, preferred band in the optimized neighbor access point list.

16. The method according to claim 15, wherein determining that the client is the multi-band client further comprises reviewing probe requests and association history for the client.

17. The method according to claim 14, wherein optimizing the neighbor access point list further comprises prioritizing access points on a same floor as the current access point associated with the client in the optimized neighbor access point list.

18. Logic encoded in a non-transitory, tangible, computer readable medium for execution by a processor, and when executed, configured to:

obtain a neighbor access point list;

maintain counters associated with access points where previous clients that associated with a current access point associated with a client have roamed, wherein the counters are reduced in a manner that preserves the proportion of the counters when a predefined threshold is exceeded;

optimize the neighbor access point list for the client associated with the current access point, by prioritizing neighboring access points within the neighbor access point list based on a determined direction of travel of the client, wherein the direction of travel is determined based at least in part on the maintained counters;

send the optimized neighbor access point list to the client; and control roaming of the client based on the optimized neighbor access point list, by denying a request from the client to associate with an access point that is not on the optimized neighbor access point list.

\* \* \* \* \*